United States Patent
Heisele

(10) Patent No.: US 9,213,892 B2
(45) Date of Patent: Dec. 15, 2015

(54) REAL-TIME BICYCLIST DETECTION WITH SYNTHETIC TRAINING DATA

(71) Applicant: Honda Motor Co., Ltd., Tokyo (JP)

(72) Inventor: Bernd Heisele, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 275 days.

(21) Appl. No.: 14/025,460

(22) Filed: Sep. 12, 2013

(65) Prior Publication Data

US 2014/0177911 A1 Jun. 26, 2014

Related U.S. Application Data

(60) Provisional application No. 61/745,225, filed on Dec. 21, 2012.

(51) Int. Cl.
*G06K 9/00* (2006.01)
*G06K 9/62* (2006.01)

(52) U.S. Cl.
CPC ........ *G06K 9/00369* (2013.01); *G06K 9/00805* (2013.01); *G06K 9/6281* (2013.01)

(58) Field of Classification Search
None
See application file for complete search history.

(56) References Cited

PUBLICATIONS

Blanz, V. et al., "Comparison of view-based object recognition algorithms using realistic 3D models," *Proceedings of International Conference on Artificial Neural Networks*, 1996, Berlin, six pages.

Cesa-Bianchi, N. et al., "Hierarchical Classification: Combining Bayes with SVM," *Proceedings of the 23rd International Conference on Machine Learning*, 2006, Pittsburgh, Pennsylvania, USA, eight pages.

Cho, H. et al., "Vision-based Bicyclist Detection and Tracking for Intelligent Vehicles," *Robotics Institute, Carnegie Mellon University*, Jan. 2010, Pittsburgh, Pennsylvania, USA, twenty-three pages.

Cho, H. et al., "Vision-based 3D Bicycle Tracking using Deformable Part Model and Interacting Multiple Model Filter," *Proceedings of the IEEE Conference on Robotics and Automation (ICRA 2011)*, May 2011, eight pages.

Chuang, S. et al., "Applying Synthetic Images to Learning Grasping Orientation from Single Monocular Images," Date Unknown, five pages.

Felzenszwalb, P. F., et al., "Object detection with discriminatively trained part-based models," IEEE Transactions on Pattern Analysis and Machine Intelligence, 2010, pp. 1627-1645, vol. 32, No. 9.

Liebelt, J., et al., "Viewpoint—independent object class detection using 3d feature maps," In Proc. IEEE Conference on Computer Vision and Pattern Recognition (CVPR), 2008, pp. 1-8.

Marin, J. et al., "Learning Appearance in Virtual Scenarios for Pedestrian Detection," *Proceedings of the 23rd IEEE Conference on Computer Vision and Pattern Recognition (CVPR 2010)*, Jun. 2010, pp. 1-8, San Francisco, CA, USA.

Messelodi, S. et al., "Vision-based bicycle/motorcycle classification," Feb. 2, 2007, twenty pages.

(Continued)

*Primary Examiner* — Abita O Fitzpatrick
(74) *Attorney, Agent, or Firm* — Arent Fox LLP

(57) ABSTRACT

A determination is made in real-time regarding whether a bicyclist is present in a target image. A target image is received. The target image is classified and an error value for the target image is determined using a linear classifier. If the error value does not exceed the threshold value, the classification is outputted. Otherwise, if the error value exceeds the threshold value, the target image is classified using a nonlinear classifier.

20 Claims, 4 Drawing Sheets

(56) References Cited

PUBLICATIONS

Shivsubramani, K. et al., "Multiclass Hierarchical SVM for Recognition of Printed Tamil Characters," AND 2007, pp. 93-98.

Takahashi, K. et al., "Bicycle Detection Using Pedaling Movement by Spatiotemporal Gabor Filtering," International Journal of Innovative Computing, Information and Control, Jun. 2012, pp. 4059-4070, vol. 8, No. 6.

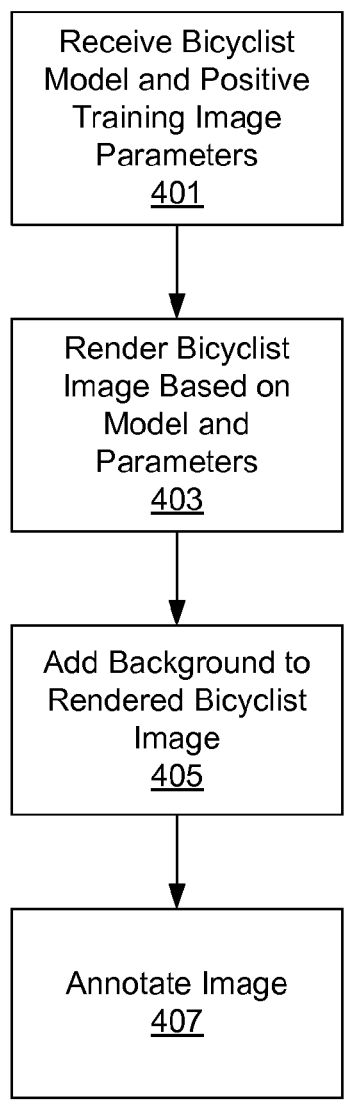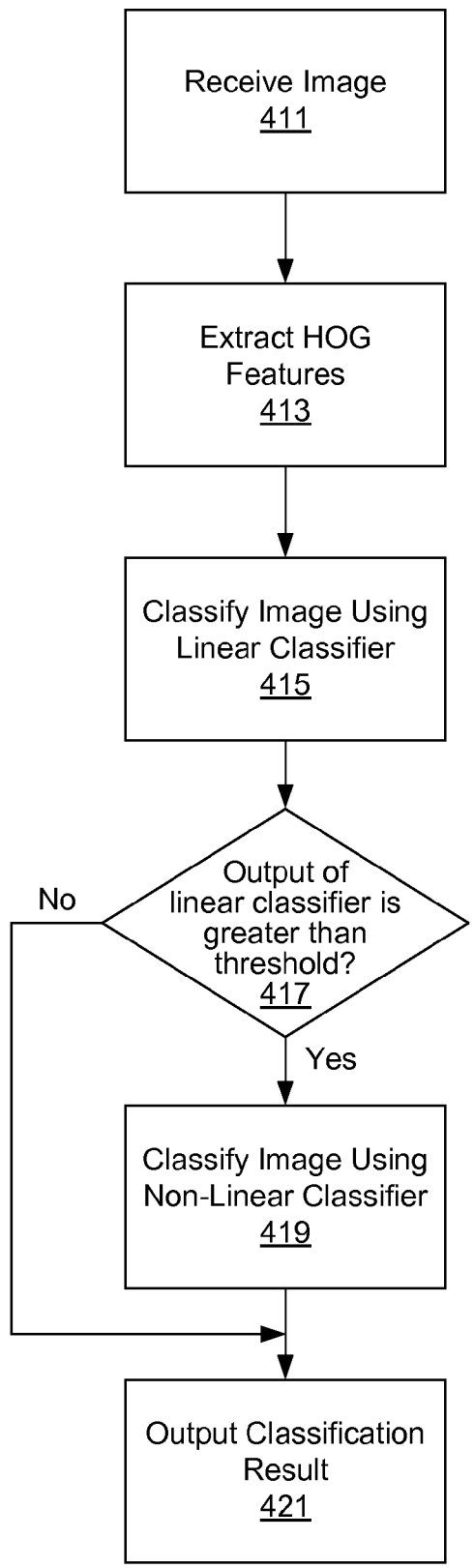
FIG. 4A
FIG. 4B

REAL-TIME BICYCLIST DETECTION WITH SYNTHETIC TRAINING DATA

RELATED APPLICATION

This application claims the benefit of U.S. Provisional Application No. 61/745,225, filed Dec. 21, 2012, which is incorporated by reference herein in its entirety.

BACKGROUND

1. Technical Field

This application generally relates to the field of object detection and, in particular, to detecting the presence of a bicyclist using a hierarchical classifier.

2. Background Information

"Object detection" refers to the task of automatically detecting the presence of an object in a video image or a still image. For example, a detection system may detect the presence of a person or a bicyclist in a still image. As used herein, "bicyclist" refers to the combination of a bicycle and its rider.

Object detection may be used, for example, in vehicles (e.g., automobiles) to increase the safety of the driver of the vehicle, pedestrians, bicyclists, and any other person sharing the road with the vehicle.

Many problems exist with current object detection systems. One problem with object detection systems is the lack of an extensive training set for training the object detection model. A training set, which includes positive samples (images including the object to be detected) and negative samples (images not including the object to be detected), is provided to a machine learning algorithm to produce an object detection model. Positive samples may be available for a limited number of object types (e.g., pedestrians), but positive samples for other types of objects (e.g., bicyclists) may be difficult to find.

Furthermore, when generating a new training set for a certain type of object, the images are manually annotated with certain pieces of information. For example, an indication that the object is present in the image and/or certain parameters of the object (e.g., color of the object and location of the object within the image) may be added to the image. The machine learning algorithm uses those annotations and images to generate a model for detecting the object. The annotation process can be tedious and time consuming.

Additionally, accurately detecting the presence of certain types of objects may be too complex and, thus, may be too slow for real-time applications. For instance, bicyclist recognition is more complex than pedestrian recognition, since variations in appearance due to viewpoint are far more pronounced in bicyclists than in pedestrians. Also, the upper body posture of bicyclists varies more than the posture of typical pedestrians. Moreover, bicyclists move faster and their proximity to vehicles is often much closer. This leads to larger variation in the size of the object and degraded image quality through motion blur and defocusing. The increase in complexity in the detection of a bicyclist compared to the detection of a pedestrian means that most detection systems are not suitable for real-time applications. Thus, certain applications (e.g., bicyclist detection in a vehicle system) may benefit from a faster object recognition scheme.

APPLICATION SUMMARY

The above and other issues are addressed by a method, non-transitory computer-readable storage medium, and system for determining in real-time whether a bicyclist is present in a target image. An embodiment of the method comprises receiving a target image. The target image is classified and an error value for the target image is determined using a linear classifier. If the error value does not exceed the threshold value, the classification is outputted. Otherwise, if the error value exceeds the threshold value, the target image is classified using a non-linear classifier.

An embodiment of the medium stores executable computer program instructions for determining in real-time whether a bicyclist is present in a target image. The instructions receive a target image. The instructions then classify the target image and determine an error value for the target image using a linear classifier. If the error value does not exceed the threshold value, the classification is outputted. Otherwise, if the error value exceeds the threshold value, the instructions classify the target image using a non-linear classifier.

An embodiment of the system for determining in real-time whether a bicyclist is present in a target image comprises at least one non-transitory computer-readable storage medium storing executable computer program instructions. The instructions receive a target image. The instructions then classify the target image and determine an error value for the target image using a linear classifier. If the error value does not exceed the threshold value, the classification is outputted. Otherwise, if the error value exceeds the threshold value, the instructions classify the target image using a non-linear classifier.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4A is a flowchart illustrating a method for generating positive samples for training a bicyclist detection model, in accordance with an embodiment.

FIG. 4B is a flowchart illustrating a method for determining the presence of a bicyclist in a still image, in accordance with an embodiment.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are now described with reference to the figures where like reference numbers indicate identical or functionally similar elements. Also in the figures, the left most digits of each reference number corresponds to the figure in which the reference number is first used.

Figure 1:
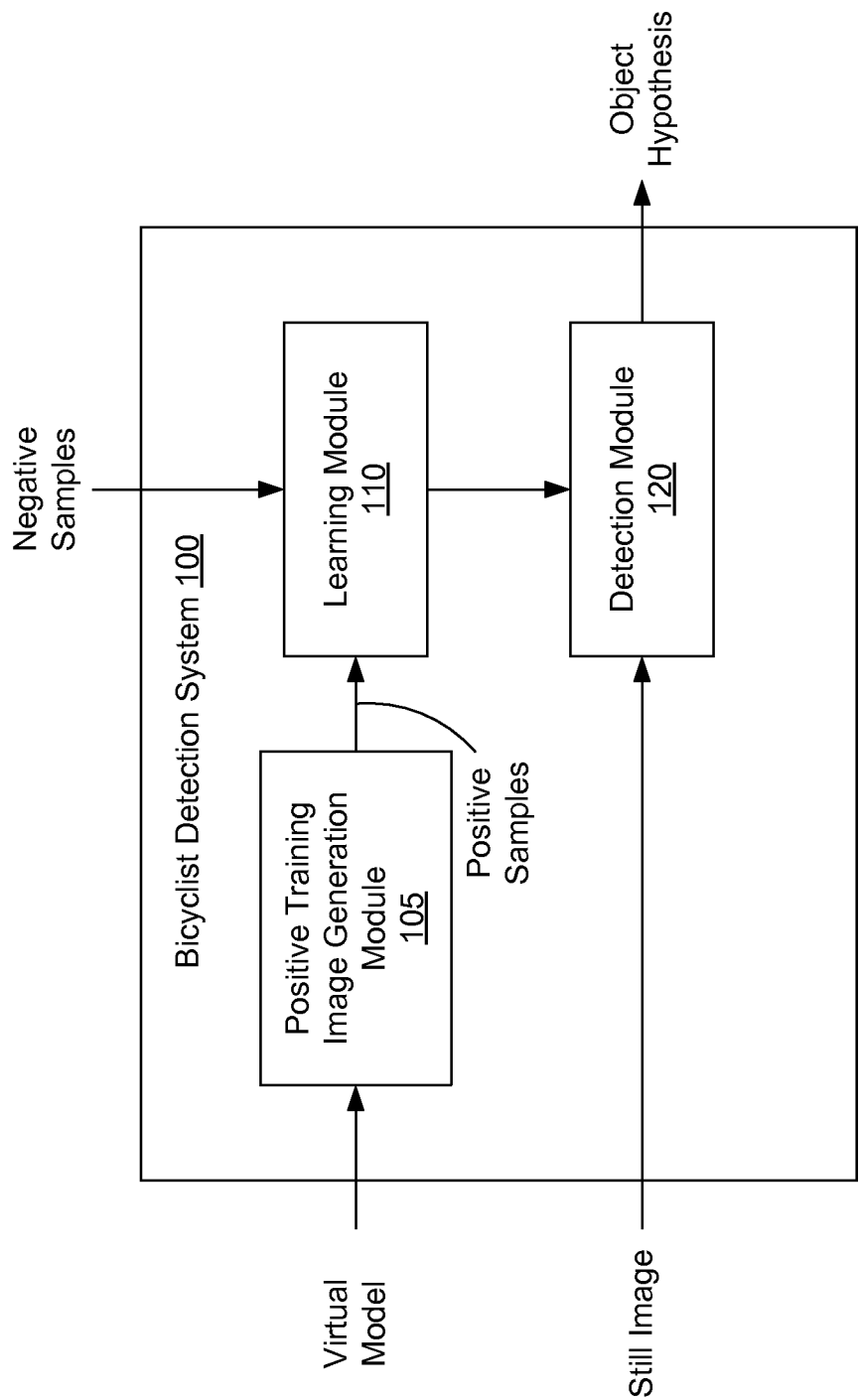
FIG. 1 is a high-level block diagram illustrating a bicyclist detection system, in accordance with an embodiment.

FIG. 1 is a high-level block diagram illustrating a bicyclist detection system 100, in accordance with an embodiment. The bicyclist detection system 100 includes a positive training image generation module 105, a learning module 110 and a detection module 120. The bicyclist detection system 100 may be used in a vehicle to determine the presence (or absence) of a bicyclist in the surroundings of the vehicle. As used herein, "bicyclist" refers to the combination of a bicycle and its rider.

The bicyclist detection system 100 may be used, for example, in a vehicle to increase the safety of the people inside the vehicle and the safety of bicyclists sharing the road with the vehicle. Drivers, while driving a vehicle, may need to pay attention to multiple objects and events happening in their surroundings. For instance, a driver may need to pay attention to traffic signs (e.g., traffic lights, speed signs, and warning signs), vehicle parameters (e.g., vehicle speed, engine speed, oil temperature, and gas level), other vehicles sharing the road, pedestrians trying to cross the street, etc. Sometimes, bicyclists, who also share the road with vehicles, may be overlooked and may be involved in an accident.

The bicyclist detection system 100 may be used to detect the presence of a bicyclist. If such a presence is detected, then the driver can be alerted of the presence of the bicyclist. The driver can also be alerted of the location of the bicyclist (e.g., right side of the vehicle, left side of the vehicle, and in front of the vehicle), the speed of the bicyclist, the direction the bicyclist is heading, the distance between the vehicle and the bicyclist, etc.

The positive training image generation module 105 receives as an input a three-dimensional (3D) virtual model of a bicyclist, generates a two-dimensional (2D) image of the bicyclist, and outputs the generated 2D image. Since the 2D image necessarily includes a bicyclist, the 2D image is used as a "positive sample" for training an object detection model. The positive training image generation module 105 may also receive a set of parameters to use when generating the 2D image of the bicyclist.

The learning module 110 receives as an input the 2D images generated by the positive training image generation module 105 ("positive samples") and images that do not include a bicyclist ("negative samples"). The learning module 110 then uses the positive samples and the negative samples to train a hierarchical classifier for detecting the presence of a bicyclist in an image and outputs the trained hierarchical classifier. The positive samples are further described below with reference to FIG. 3A. The negative samples are generated by randomly cropping natural images of street scenes at random scale and location.

The detection module 120 receives the hierarchical classifier trained by the learning module 110 and a still image, generates an object hypothesis, and outputs the hypothesis. In some embodiments, the still image is captured by a camera mounted on a vehicle. For instance, still images may be captured with a charged coupled device (CCD) camera with a $\frac{1}{1.8}$ inch sensor. To increase the shutter speed of the camera and reduce image blur, a camera with a larger sensor may also be used. In some embodiments, still images are obtained by extracting selected frames from a video. The object hypothesis may be a binary result (e.g., yes/no or bicyclist is present/absent).

Figure 2:
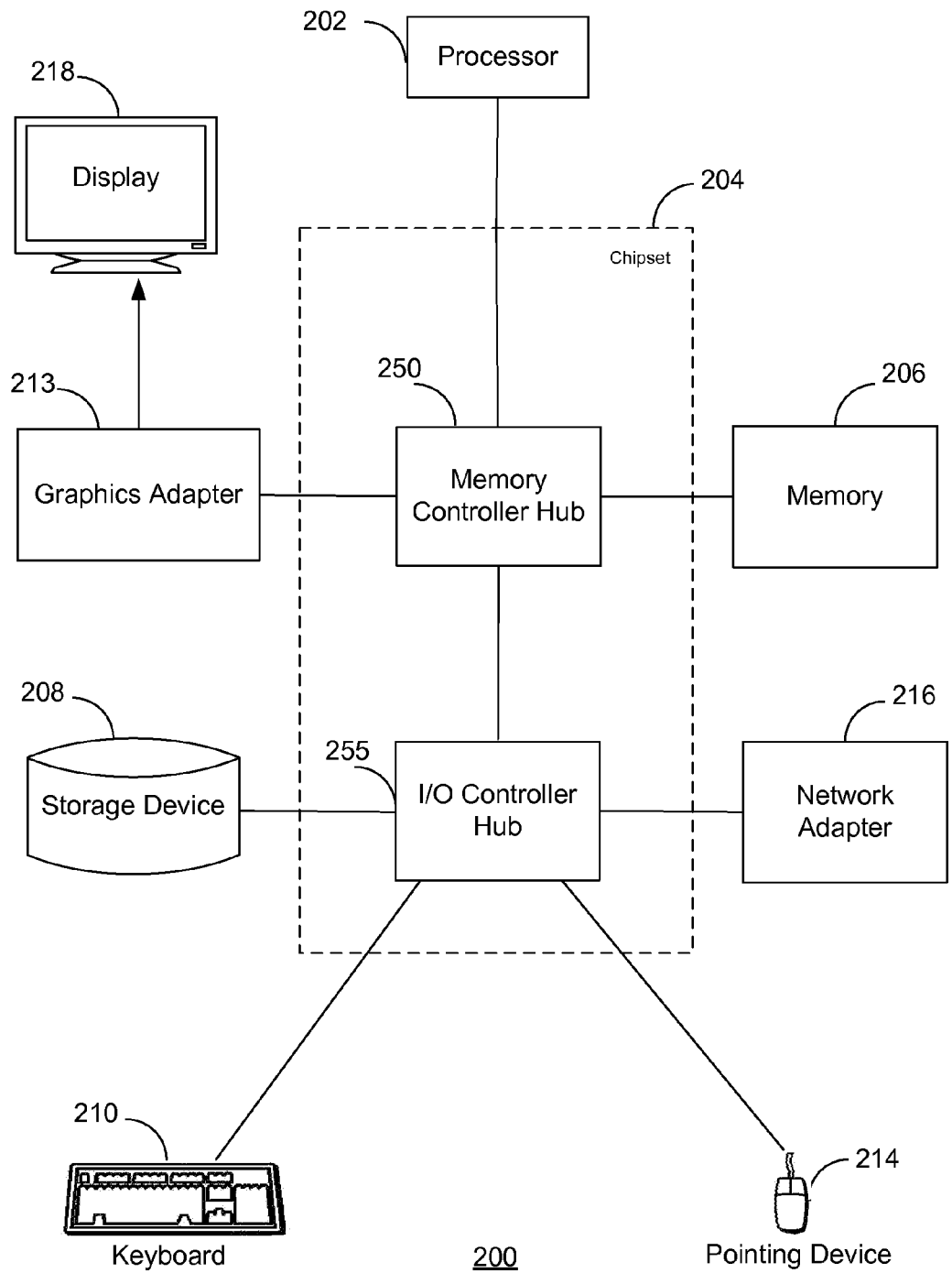
FIG. 2 is a high-level block diagram illustrating an example of a computer for use as the bicyclist detection system illustrated in FIG. 1, in accordance with an embodiment.

FIG. 2 is a high-level block diagram illustrating an example of a computer 200 for use as the bicyclist detection system 100 illustrated in FIG. 1, in accordance with an embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to a communications network or other computer system (not shown).

Some embodiments of the computer 200 have different and/or other components than those shown in FIG. 2. For example, the computer 200 can be an embedded system and lack a graphics adapter 213, display device 218, keyboard 210, pointing device 214, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3B:
FIG. 3B is a high-level block diagram illustrating a detailed view of the detection module illustrated in FIG. 1, in accordance with an embodiment.
Figure 3A:
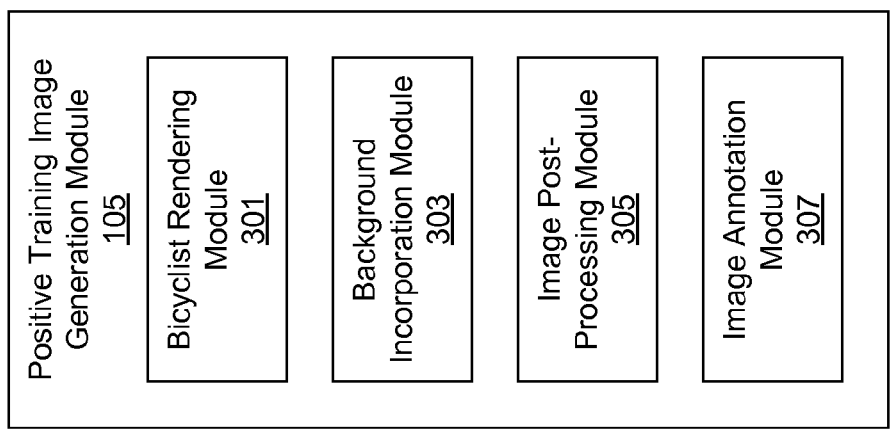
FIG. 3A is a high-level block diagram illustrating a detailed view of the positive training image generation module illustrated in FIG. 1, in accordance with an embodiment.

FIG. 3A is a high-level block diagram illustrating a detailed view of the positive training image generation module 105 illustrated in FIG. 1, in accordance with an embodiment. The positive training image generation module 105 includes a bicyclist rendering module 301, a background incorporation module 303, an image post-processing module 305, and an image annotation module 307.

The bicyclist rendering module 301 receives as an input a three-dimensional (3D) virtual model of a bicyclist (a bicycle and the person riding the bicycle) and a set of parameters, renders a two-dimensional (2D) image of the bicyclist based on the received parameters, and outputs the rendered 2D image. The set of parameters may include, for example, color of the bicycle, gender of the person riding the bicycle, clothing of the person riding the bicycle, pose of the person riding the bicycle, illumination of the bicyclist, etc.

In one embodiment, the bicyclist rendering module 301 receives as an input a bicycle model and a human model and combines the two models to generate a bicyclist model. The human model may receive as an input one or more parameters such as gender (e.g., male or female), body type (ectomorph, endomorph, or mesomorph), hair style (long hair, short hair, bald, etc.), hair color (black, brown, blond, etc.), etc. Additionally, the human model may also include models of one or more articles of clothing (shirt, pants, shoes, etc.) and/or accessories (hat, backpack, watch, etc.). In some embodiments, the clothing and/or accessories models may be stored in a database or repository.

The bicycle model may receive as an input one or more parameters such as color, size, reflectivity, texture, etc. In some embodiments, the bicyclist detection system 100 may include a bicycle model data store (not shown) that stores multiple bicycle models from which the positive training image generation module 105 can choose a bicycle model to use to generate the bicyclist model.

Additionally, the positive training image generation module 105 may also receive lighting parameters (e.g., lighting source azimuth, lighting source elevation, lighting source intensity, and ambient light energy), camera parameters (e.g., camera azimuth, camera elevation, and camera rotation), and rendering parameters (image size, border size, etc.).

The background incorporation module 303 receives as input the 2D bicyclist image generated by the bicyclist rendering module 301 and a 2D background image, combines the bicyclist image and the background image, and outputs the combined 2D image. In some embodiments, the background image is chosen from a library of background images. The background incorporation module 303 may also receive as a parameter a location that indicates where, within the background image, the bicyclist image should be placed and places the bicyclist image in the received location. For example, the background incorporation module 303 may receive as a parameter a coordinate point indicating where to place the bicyclist image within the background image. Alternatively, the background incorporation module 303 may receive as a parameter two points defining a square in which the bicyclist image should be placed.

The image post-processing module 305 receives a 2D image of a bicyclist with a background, edits the received image so that it can be used by the learning module 110, and outputs the edited image. For example, the image post-processing module 305 may smooth the image, down sample the image, crop the image, etc.

The image annotation module 307 receives as input the image output by the image post-processing module 305, annotates the received image with the ground truth of the received image, and outputs the annotated image. In some embodiments, the ground truth is a binary value, either "yes" (a bicyclist is present) or "no" (a bicyclist is not present). In other embodiments, the ground truth also includes one or more of the parameters used to render the image (e.g., information regarding the person riding the bicycle, such as pose, or information regarding the bicycle itself, such as the type of bicycle). The ground truth may also include the position of the bicyclist in the image. For example, the image annotation module 307 may annotate the image with a coordinate point (or two points defining a square) indicating where the bicyclist is located in the image.

FIG. 3B is a high-level block diagram illustrating a detailed view of the detection module 120 illustrated in FIG. 1, in accordance with an embodiment. The detection module 120 includes a histogram oriented gradients (HOG) extraction module 311, a linear classification module 313, and a non-linear classification module 315.

The histogram oriented gradients (HOG) extraction module 311 receives a still image, extracts HOG features from the received still image, and outputs the extracted features. As used herein, histogram oriented gradients (HOG) are feature descriptors used in computer vision and image processing for the purpose of object detection. A HOG feature indicates the number of occurrences of gradient orientation in a localized portion of an image.

The HOG extraction module 311 extracts HOG features by dividing the received image into multiple cells. For example, the HOG extraction module 311 may calculate HOG features using a cell size of 8×8 pixels. For each cell, the HOG extraction module 311 calculates a one dimensional (1D) histogram of gradient directions over the pixels of the cell. In some embodiments, the HOG extraction module 311 normalizes the image for variation of illumination throughout the received image by dividing the image into blocks, calculating a local histogram energy of the block, and normalizing the cells within the block based on the calculated local histogram energy. For example, the HOG extraction module 311 may calculate local histogram energies with a block size of 2×2 cells.

In one embodiment, the HOG extraction module 311 extracts HOG features from an image with a predefined size. For instance, the HOG extraction module 311 may extract HOG features from a 48×48 pixel image. If the received image is larger or smaller in size, the HOG extraction module downscales or upscales the image until the image size is equal to the predefined image size.

The linear classification module 313 receives as input a set of HOG image features, uses a linear classifier (e.g., linear support vector machine or "linear SVM") and the HOG features to determine whether a bicyclist is present in the image associated with the features, and outputs the classification and an error value. The error value indicates a probability that the classification is incorrect. As used herein, a linear classifier identifies which class (e.g., bicyclist present/absent) an object (e.g., a still image) belongs to based on a linear combination (or function) of the characteristics or features of the object. In one embodiment, the output of the linear classifier is given by $$y = f(w \cdot x)$$

where y is the output of the linear classification module, w is a weight vector determined by the learning module 110, and x is a feature vector containing the values of the features of the object being classified.

The non-linear classification module 315 receives as input a set of HOG image features, uses a non-linear classifier (e.g., radial basis function support vector machine or "RBF-SVM") and the HOG features to determine whether a bicyclist is present in the image associated with the features, and outputs the classification. As used herein, a non-linear classifier identifies which class (e.g., bicyclist present/absent) an object (e.g., an image) belongs to based on a non-linear combination (or function) of the features of the object.

FIG. 4A is a flowchart illustrating a method for generating positive samples for training a bicyclist detection model, in accordance with an embodiment. The positive training image generation module 105 receives 401 a bicyclist model and positive training image parameters.

The bicyclist rendering module 301 renders 403 an image of a bicyclist based on the received bicyclist model and the received positive training image parameters.

The background incorporation module 303 adds 405 a background to the rendered bicyclist image.

In some embodiments (not shown), the image post-processing module 305 may apply image post-processing techniques (e.g., smoothing, down sampling, cropping) to the image of a bicyclist with a background.

The image annotation module 307 annotates 407 the combined image (bicyclist plus background) with the ground truth. For instance, the image annotation module 307 may annotate the image with a binary value indicating that the image is a positive sample. In other embodiments, the image annotation module 307 further annotates the image with one or more of the received positive training image parameters, such as the pose of the person riding the bicycle or the type of bicycle used to render the bicyclist image.

The steps illustrated in FIG. 4A may be repeated multiple times (using different bicyclist models, positive training image parameters, and/or backgrounds) to generate multiple positive samples. For instance, the steps of FIG. 4A may be repeated thousands of times to produce thousands of positive samples.

FIG. 4B is a flow chart illustrating a method for determining the presence of a bicyclist in a still image, in accordance with an embodiment. The detection module 120 receives 411 a still image to be classified. In some embodiments, the image may be captured with a camera mounted in a vehicle.

The HOG extraction module 311 analyzes the received still image and extracts 413 the HOG features from the received still image.

The linear classification module 313 classifies 415 the image using a linear classifier and the HOG features extracted by the HOG extraction module 311, outputting a classification and an error value.

The error value output by the linear classification module 313 is compared 417 to a threshold. If the error value output by the linear classification module 313 is smaller than the threshold, then the classification output by the linear classification module 313 is used to determine whether a bicyclist was present in the image. Otherwise, if the error value output by the linear classification module 313 is greater than the threshold, the received image is classified 419 by the non-linear classification module 315 using a non-linear classifier and the HOG features extracted by the HOG extraction module 311, outputting a classification.

The classification results are outputted 421. In some embodiments, the output of the bicyclist detection system 100 is a binary result (e.g., bicyclist present/absent). In other embodiments, the bicyclist detection system 100 outputs additional information such as the position of the bicyclist relative to the received image. The output of the bicyclist detection system 100 may, for example, be used to alert the driver of a vehicle of the presence of a nearby bicyclist.

In some embodiments, the bicyclist detection system 100 uses a resolution pyramid and a sliding fixed-size detection window to determine the presence of a bicyclist in a received still image. For instance, the detection module 120 may use a resolution pyramid with a factor of $\sqrt{2}$ at 10 scales, starting at the original image resolution and a detection window size of 48×48 pixels and stride length of 4 pixels. That is, 48×48 pixel sub-images are extracted from the original image with a stride length of 4 pixels, and the extracted images are sent to the detection module 120 to determine whether a bicyclist is present in the 48×48 pixel sub-image. After every sub-image is analyzed by the detection module, the original image is down-scaled with a factor of $\sqrt{2}$. 48×48 pixel sub-images are extracted from the down-scaled image and sent to the detection module 120 to determine whether a bicyclist is present in the 48×48 pixel sub-image. This process is repeated until sub-images from every scale (e.g., 10 scales) have been analyzed.

The bicyclist detection system 100 may further suppress redundant detections (e.g., same bicyclist detected at two different scales). In one embodiment, for a given original resolution image, to suppress redundant detections, every detection is added to a detection list and sorted according to decreasing detection strength (e.g., decreasing SVM value). The first element in the list is selected as the current maximum and the remaining detections are tested for overlap in their detection windows with the current maximum. For a given detection, if the ratio between the intersection and the union of the detection and the current maximum is greater than a threshold (e.g., 25%), the detection is added to the group of detections suppressed by the current maximum. Once suppressed or selected as a maximum, the detection is removed from the detection list. This process is repeated until all the detections are removed from the detection list. Then, a single detection window is computed for each group by taking the mean over the windows that lie within the median scale of the group.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method for determining in real-time whether a bicyclist is present in a target image, comprising steps of:
   receiving the target image;
   determining a first classification and an error value for the target image using a linear classifier, wherein the error value indicates a probability that the first classification is incorrect;
   responsive to the error value not exceeding a threshold:
      outputting the first classification; and
   responsive to the error value exceeding the threshold:
      determining a second classification for the target image using a non-linear classifier; and
      outputting the second classification.

2. The method of claim 1, further comprising:
   generating a plurality of synthetic images of a bicyclist based on a three-dimensional model of the bicyclist; and
   training the linear classifier and the non-linear classifier using the generated plurality of synthetic images.

3. The method of claim 2, wherein generating the plurality of synthetic images of the bicyclist comprises:
   rendering an image of a person riding a bicycle based on the three-dimensional model of the bicyclist; and
   adding a background to the rendered image, thereby generating a combined image.

4. The method of claim 3, wherein generating the plurality of synthetic images of the bicyclist further comprises at least one of down-sampling the combined image, smoothing the combined image, and cropping the combined image.

5. The method of claim 3, wherein generating the plurality of synthetic images of the bicyclist is performed based on the three-dimensional model of the bicyclist and based on a parameter.

6. The method of claim 5, wherein the parameter comprises one of information regarding the person, information regarding the bicycle, and information regarding a position of the bicyclist within the rendered image.

7. The method of claim 5, further comprising annotating the combined image with the parameter.

8. The method of claim 2, further comprising generating the three-dimensional model of the bicyclist based on a three-dimensional model of a bicycle and a three-dimensional model of a person.

9. The method of claim 1, further comprising:
   receiving a plurality of negative training images, wherein a negative training image does not show a bicyclist; and
   training the linear classifier and the non-linear classifier using the plurality of negative training images.

10. The method of claim 1, wherein the linear classifier includes a linear support vector machine (SVM).

11. The method of claim 1, wherein the non-linear classifier includes a radial basis function (RBF) support vector machine (SVM).

12. The method of claim 1, wherein the linear classifier performs classification based on histogram of oriented gradients (HOG) image features.

13. The method of claim 12, further comprising extracting HOG image features from the target image.

14. A non-transitory computer-readable storage medium configured to store instructions for determining in real-time whether a bicyclist is present in a target image, the instructions when executed by a processor cause the processor to:
   receive the target image;
   determine a first classification and an error value for the target image using a linear classifier, wherein the error value indicates a probability that the first classification is incorrect;
   responsive to the error value not exceeding a threshold:
      output the first classification; and
   responsive to the error value exceeding the threshold:
      determine a second classification for the target image using a non-linear classifier; and
      output the second classification.

15. The non-transitory computer-readable storage medium of claim 14, wherein the instructions when executed by the processor further cause the processor to:
   generate a plurality of synthetic images of a bicyclist based on a three-dimensional model of the bicyclist; and
   train the linear classifier and the non-linear classifier using the generated plurality of synthetic images.

16. The non-transitory computer-readable storage medium of claim 15, wherein generating the plurality of synthetic images of the bicyclist comprises:
   rendering an image of a person riding a bicycle based on the three-dimensional model of the bicyclist; and
   adding a background to the rendered image, thereby generating a combined image.

17. The non-transitory computer-readable storage medium of claim 16, wherein generating the plurality of synthetic images of the bicyclist is performed based on the three-dimensional model of the bicyclist and based on a parameter.

18. A system for determining in real-time whether a bicyclist is present in a target image, comprising:

a processor; and
a non-transitory computer-readable storage medium storing instructions, the instructions when executed by the processor cause the processor to:
receive the target image;
determine a first classification and an error value for the target image using a linear classifier, wherein the error value indicates a probability that the first classification is incorrect;
responsive to the error value not exceeding a threshold:
output the first classification; and
responsive to the error value exceeding the threshold:
determine a second classification for the target image using a non-linear classifier; and
output the second classification.

19. The system of claim 18, wherein the instructions when executed by the processor further cause the processor to:
generate a plurality of synthetic images of a bicyclist based on a three-dimensional model of the bicyclist; and
train the linear classifier and the non-linear classifier using the generated plurality of synthetic images.

20. The system of claim 19, wherein generating the plurality of synthetic images of the bicyclist comprises:
rendering an image of a person riding a bicycle based on the three-dimensional model of the bicyclist; and
adding a background to the rendered image, thereby generating a combined image.

* * * * *